United States Patent
Capouellez et al.

(10) Patent No.: US 6,254,194 B1
(45) Date of Patent: Jul. 3, 2001

(54) THERMAL SIGNATURE REDUCTION COVER FOR HUB AND WHEEL

(75) Inventors: James A. Capouellez, Sterling Heights; John G. Korpi, Livonia, both of MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/496,331

(22) Filed: Feb. 2, 2000

(51) Int. Cl.$^7$ ............................... B60B 7/00; B60B 7/14
(52) U.S. Cl. .................. 301/37.23; 301/37.22; 301/37.1; 301/37.37
(58) Field of Search .................. 301/37.1, 37.22, 301/37.23, 37.37, 37.42, 108.1, 108.2, 108.3, 108.4

(56) References Cited

U.S. PATENT DOCUMENTS

| | | | | |
|---|---|---|---|---|
| 1,403,446 | * | 1/1922 | Rothmann | 301/37.1 |
| 2,490,822 | * | 12/1949 | Lyon | 301/37.1 |
| 3,055,712 | * | 9/1962 | Shoemaker | 301/37.1 |
| 3,055,713 | * | 9/1962 | Lyon | 301/37.1 |
| 4,235,271 | * | 11/1980 | Olsen et al. | 301/37.22 |
| 4,533,183 | * | 8/1985 | Gant | 301/37.23 |
| 4,981,329 | * | 1/1991 | Koch et al. | 301/37.1 |
| 5,531,508 | * | 7/1996 | Bell, III | 301/37.23 |
| 6,048,036 | * | 4/2000 | Alaoui | 301/37.1 |

FOREIGN PATENT DOCUMENTS

| | | | | |
|---|---|---|---|---|
| 3631489 | * | 3/1988 | (DE) | 301/37.23 |
| 2232129 | * | 12/1990 | (GB) | 301/37.23 |

* cited by examiner

*Primary Examiner*—S. Joseph Morano
*Assistant Examiner*—Jason R. Bellinger
(74) *Attorney, Agent, or Firm*—David L. Kuhn; Gail S. Soderling

(57) ABSTRACT

The invention is a structure for reducing the thermal signature of an assembly on a vehicle that includes a hub, a wheel on the hub and a tire on the wheel. The structure comprises a generally planar cover disposed outboard of the assembly so that an air gap is between the cover and the assembly. A set of multifunctional elements lock the wheel to the hub, space the cover from the wheel and help retain the cover in connection with the wheel. In one embodiment, the cover is an eccentric, lobed sheet metal member that completely eclipses the wheel and partly eclipses the tire from a point of view outboard of the vehicle. In another embodiment, the cover has an inner unit comprised of metal plates having an insulating disk therebetween and further comprises a flexible flange encircling the inner unit.

6 Claims, 2 Drawing Sheets

THERMAL SIGNATURE REDUCTION COVER FOR HUB AND WHEEL

GOVERNMENT USE

The invention described here may be made, used and licensed by the or for the U.S. Government for governmental purposes without paying us any royalty.

BACKGROUND

A significant characteristic of modern military vehicles is their appearance when viewed through an infrared optical instrument. This appearance is characteristic for a given vehicle type and is commonly referred to as the vehicle's infrared or thermal signature. The infrared signature is a tactical disadvantage in combat and accordingly one desires to reduce this signature. Of the various features that affect a vehicle's infrared signature, the hubs and wheels are among the most important. The hubs, wheels, and to a lesser extent, the tires tend to get hotter than the surrounding vehicle structure as the vehicle travels. The hubs wheels and tires thus provide a relatively easy means for detecting the vehicle by infrared instruments and even for identifying the vehicle as to type.

SUMMARY

To address the foregoing concerns, we have invented a cover that obscures the thermal signature of the hub, wheel and tire. The cover is of simple construction and is easily installed on existing vehicles, so that the cover can be made and installed by US Army maintenance units around the world, thereby minimizing the logistic cost and effort of retrofitting the cover onto elements of the Army vehicle fleet. The cover is spaced outboard from the wheel and tire by at least half an inch, so as to have an insulating body of air separating the cover from the wheel and tire. In the preferred embodiment, the cover is a planar sheet metal element having variously shaped lobes asymmetrically disposed relative to the cover's center of gravity. The cover completely masks or eclipses the wheel from a point of view outboard of the vehicle and partly eclipses the tire so as to obscure or disguise the tire's visual and thermal images. In another embodiment, the cover has a flat round inner unit comprised of metal plates and an insulating disk between them. The inner unit thermally masks the wheel and a flange girding the inner unit thermally likewise masks the tire.

DETAILED DESCRIPTION

Figure 1:
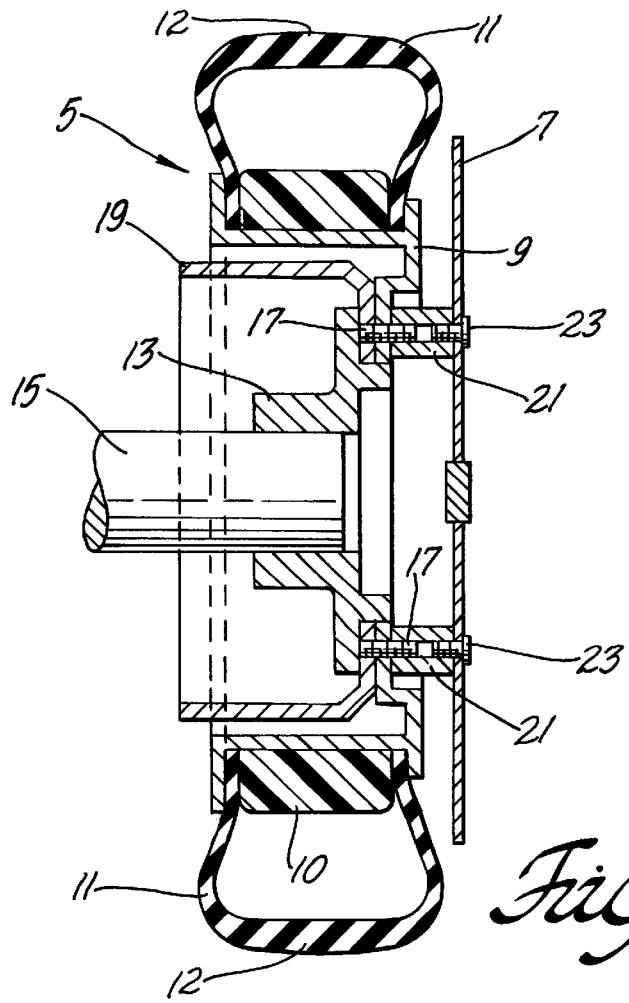
FIG. 1 is a sectional view of an assembly of a vehicle hub, wheel and tire in which my cover is mounted on the assembly.

In FIG. 1 is shown a wheel assembly 5 modified to include a specially designed cover 7 for reducing and disguising the thermal signature of wheel 9, tire 11, hub 13 and axle 11. Assembly 5 includes hub 13 on the end of axle 15 of the vehicle, the hub having a set of threaded posts 17 affixed thereto. Typically a brake drum 19 and wheel 9 are mounted on hub 13 and have suitable apertures through which the posts protrude. For military off-road vehicles, the tire is often a run-flat tire having a solid annular insert and an inflatable carcass 12. Wheel 9 and drum 19 are held fast on hub 13 by elongate hexagonal fasteners 21, the inboard ends of which thread onto posts 17 and bear against wheel 9. The outboard ends of fasteners thread with bolts 23 by which cover 7 is attached to the fasteners. The fasteners act as spacers to keep cover 7 axially remote from wheel 9 and tire 11 by a selected distance of at least one-half an inch, one inch being a typical distance on vehicles such as the Light Armored Vehicle, or LAV, used by the United States Army. An insulating body of air occupies the gap between cover 7 from wheel 9 and tire 11.

It will be noted that cover 7 completely eclipses wheel 9 when assembly 5 is viewed from the outboard direction, or from the right in FIG. 1. However, cover 7 eclipses only some of tire 11 when assembly 5 is viewed from that direction and typically eclipsed about one-half the tire. Due to the shaping of cover 7, the partial eclipse of the tire by the cover reduces or disguises the tire's thermal signature while preventing any damage to tire 11 as the tire compresses under the vehicle's weight.

Figure 2:
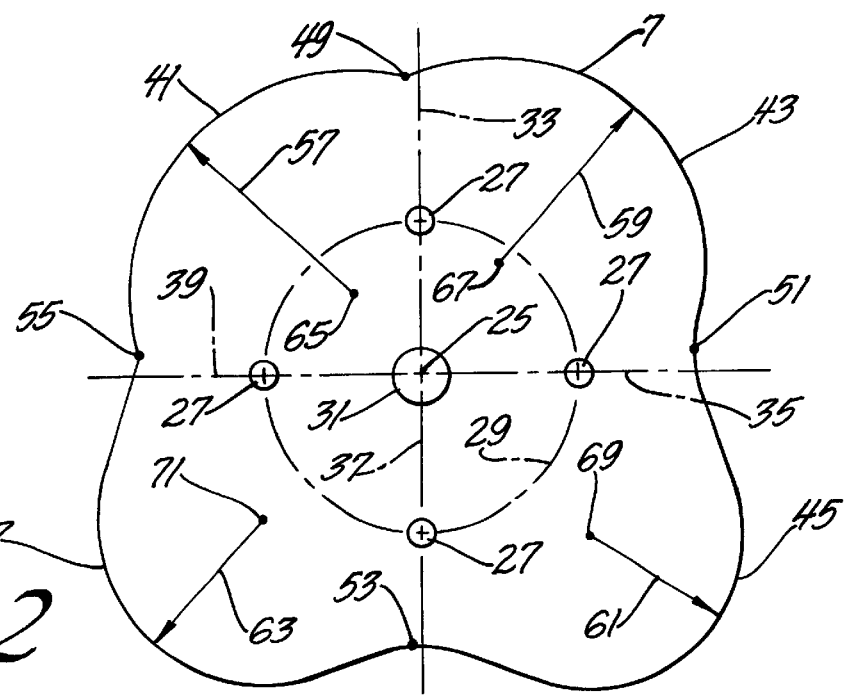
FIG. 2 is a front elevational view of the cover, which is seen from a point outboard of the vehicle on which the cover is installed.
Figure 3:
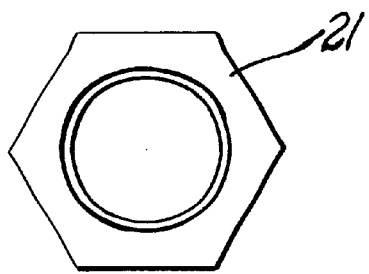
FIG. 3 is an end view of a fastener used to hold the cover on the wheel.

The configuration of cover 7, essentially an eccentric planar body, is best discussed with reference to FIG. 2. The cover has its center of gravity at point 25 and a pattern of bolt holes 27 at regular intervals equidistant from point 25. The centers of holes 27 all lie on a reference circle 29. Optionally, the center of cover 7 has a sight glass 31 through which wheel 9 can be viewed for inspection purposes. Cover 7 has a plurality of sectors of equal angular size and equal mass, the sectors being bordered by lines 33, 35, 37 and 39 radiating from point 25. Associated with each sector is one of a plurality of adjoined lobes 41, 43, 45 and 47, and at reference numerals 49, 51, 53 and 55 are junctions on the cover's edge where one lobe ends and another begins. The junctions are not corners, but are smooth curves, which may have small radii of curvature as at 55 and 49.

The junction points show part of the intended irregularity in the shape of cover 7. Namely, the associated lobes and sectors align substantially but not exactly, wherein at least 80% of the associated lobe and sector overlap one another. Accordingly, the lobes extend unequal angular distances relative to point 25 so that the lobes do not register exactly with the sectors. Particularly, lobe 41 reaches the edges of its sector in neither the clockwise nor the counterclockwise direction, whereas diametrically opposed lobe 45 extends past its sector in both directions. Lobe 43 extends counterclockwise past its sector but does not reach clockwise to the sector edge, whereas diametrically opposed lobe 47 extends clockwise past its sector but does not counterclockwise reach the sector edge.

Another intended irregularity in the shape of cover 7 is the difference in lengths of the respective radii of curvature 57, 59, 61 and 63 for lobes 41, 43, 45 and 47. Still another intended irregularity is the differing distances of the associated centers of curvature 65, 67, 69 and 71 from point 25 and reference circle 29. Additionally, the lobes' radii of curvature are offset relative to any radii extending from point 25; that is, none of the lobes' radii of curvature is parallel to any radius that can be drawn from point 25.

It is preferred that transitions from one lobe to another be relatively smooth. That is, the transition is a smooth curve as in the region near point 51 or else the junction point is at the vertex of what appears to be a corner forming an obtuse angle of at least 160 degrees, as at points 49 and 55. As noted before, points 49 and 55 are not actually corners but are at zones having small radii of curvature. It is preferred that cover 7 be fabricated of a relatively light, thin sheet metal stock. The sheet thickness of cover 7 is typically one-quarter of an inch and the metal is typically a 7075-T6 aluminum alloy. The lightness of the cover reduces the cover's dynamic imbalance as it spins with wheel 9.

Figure 4:
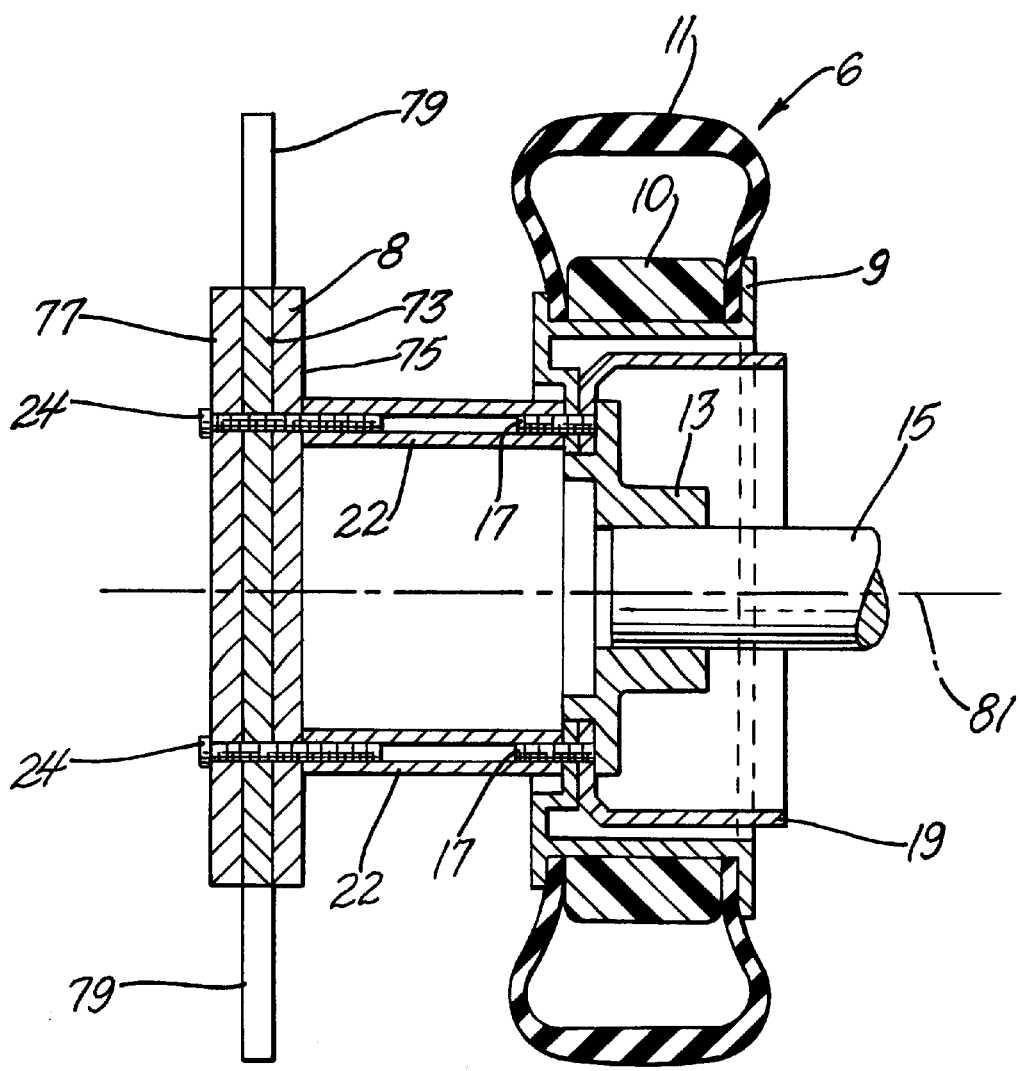
FIG. 4 is a sectional view of the hub, wheel and tire with an alternate embodiment of the cover installed thereon.

Shown in FIG. 4 is a second embodiment 6 of a wheel assembly including a wheel cover 8 for mninimizing the thermal signature of hub 13, axle 15, wheel 9 and tire 11. Cover 8 is attached to wheel 9 by bolts 24 and fasteners 22, which are similar to but longer than fasteners 21 in FIG. 1. Cover 8 has a round inner unit comprised of a disk 73 of insulating material sandwiched between two round metal plates 75 and 77. A flat annular flange 79 on disk 73 is oriented normal to wheel axis 81 and is preferably comprised of flexible bristles radiating away from axis 81. Alternatively, flange 79 may be comprised of an elastomeric material, interwoven fibers or a combination of fibers and elastomeric material, so long as the flange retains its flat annular shape unless it strikes the ground or an object thereon. Flange 79 is opposed to tire 11 and in axial registry therewith , so that the flange will eclipse tire 11 but not wheel 9 when assembly 6 is viewed from the outboard direction, which is from the left in FIG. 4. In a similar fashion, the plates and disk eclipse wheel 9, but do not appreciably eclipse the tire.

I wish it to be understood that I do not desire to be limited to the exact details of construction or method shown herein since obvious modifications will occur to those skilled in the relevant arts without departing from the spirit and scope of the following claims.

What is claimed is:

1. On an assembly including a hub, a wheel mounted to the hub and a tire on the wheel, a structure for modifying a thermal signature of the assembly, comprising:

posts on the hub passing through the wheel;

a planar, asymmetric cover remote from the assembly in an outboard direction;

multi-function means for connecting the cover to the posts, spacing the cover from the assembly and holding the wheel against the hub;

sectors of the cover of equal mass; and a set of joined, differently shaped lobes of the cover, each lobe being associated with a different sector, wherein associated lobes and sectors are substantially but not exactly aligned with each other; and wherein the cover eclipses the wheel along a line of sight from the outboard direction and the lobes partly eclipse the tire from the outboard direction.

2. The structure of claim 1 further comprising:

a center of gravity of the cover;

centers of curvature of the lobes, the centers of curvature being disposed at different distances from the center of gravity; and radii of curvature of the lobes, the radii of curvature having different lengths.

3. The structure of claim 1 further comprising relatively smooth transitions between any one lobe and an adjoining lobe.

4. In an assembly including a hub, a wheel on the hub and a tire on the wheel, a structure for modifying a thermal signature of the assembly, comprising:

posts on the hub extending through the wheel;

a planar, asymmetric cover axially remote in an outboard direction from the assembly;

a multifunction means for connecting the cover to the posts, spacing the cover from the assembly and holding the wheel against the hub;

wherein the cover eclipses the wheel as viewed from the outboard direction and the lobes partly eclipse the tire from the outboard direction;

the cover divided into sectors of equal mass and equal angular size;

a set of joined lobes of the cover, each of the lobes being associated with a different one of the sectors, wherein associated lobes and sectors are substantially but not exactly aligned with one another;

radii of curvature of the lobes, the radii having different lengths;

a center of gravity of the cover where all the sectors meet;

centers of curvature for the lobes, the centers of curvature being disposed at different distances from the center of gravity; and relatively smooth transitions between any one lobe and an adjoining lobe.

5. In an assembly on a vehicle including a hub, a wheel on the hub and a tire on the wheel, a structure for reducing a thermal signature of the assembly, comprising:

posts on the hub extending through the wheel;

a generally planar cover axially remote from the assembly in an outboard direction relative to the vehicle, wherein an air gap of at least several inches is defined between the cover and the assembly; and a multifunction means for connecting the cover to the posts, spacing the cover from the assembly and holding the wheel against the hub, the multifunction means comprising an elongate fastener contacting the wheel and the cover.

6. The structure of claim 5, further comprising:

a round inner unit of the cover;

an outboard plate of the unit;

an inboard plate of the unit;

a disk of insulating material between the plates; and a flexible annular flange disposed about the inner unit, the flange having a flat shape coplanar with the unit during a free state of the flange;

wherein the flange is axially opposed to the tire but not the wheel; and wherein the inner unit is axially opposed to the wheel but not the tire.

* * * * *